L. SHAFFER.
PLANT SETTING MACHINE.
APPLICATION FILED JUNE 16, 1916.

1,230,806. Patented June 19, 1917.
2 SHEETS—SHEET 1.

Inventor
L. SHAFFER
By N. S. ..... Attorney

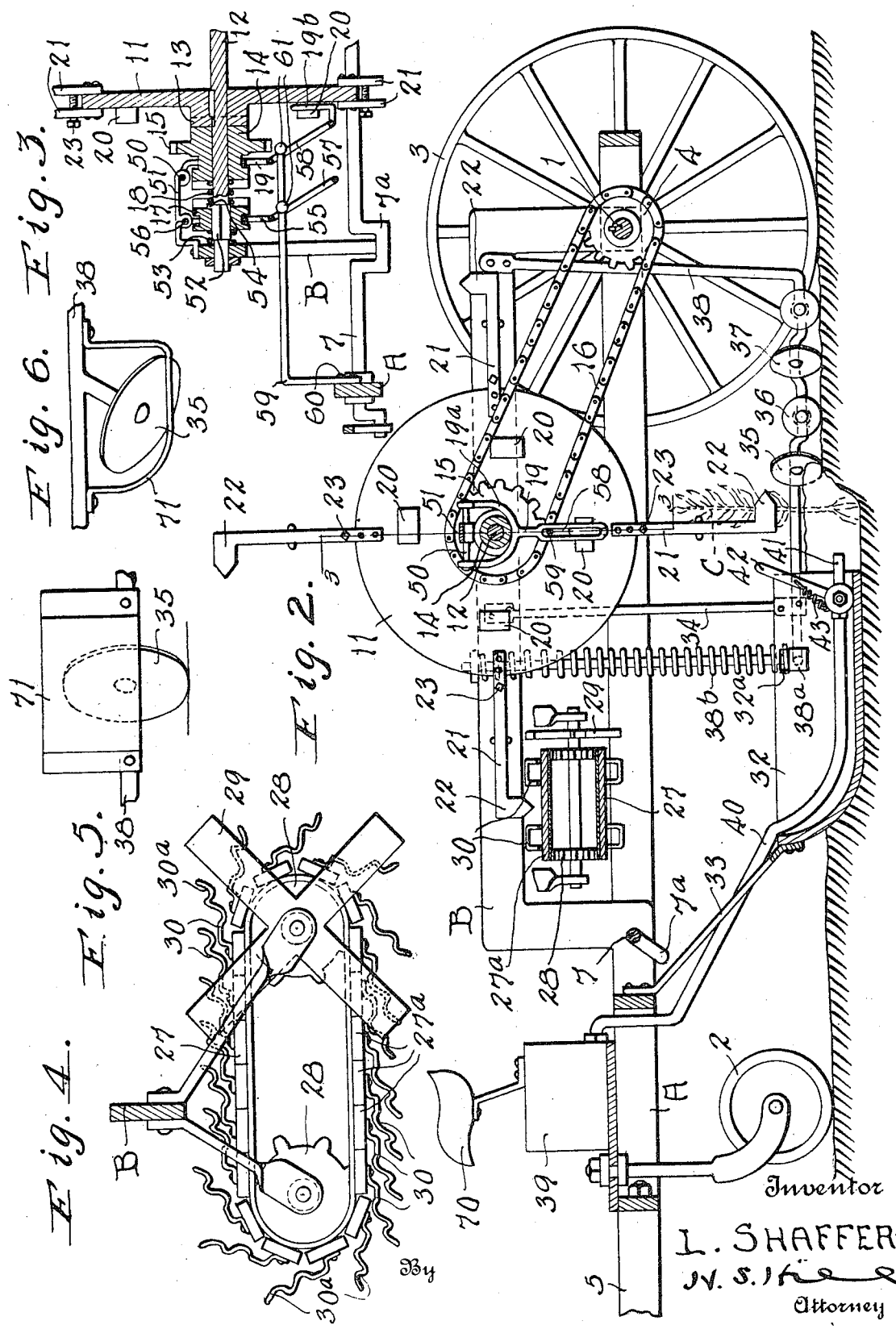

UNITED STATES PATENT OFFICE.

LUTHER SHAFFER, OF BOONE, IOWA.

PLANT-SETTING MACHINE.

1,230,806.

Specification of Letters Patent. Patented June 19, 1917.

Application filed June 16, 1916. Serial No. 103,984.

*To all whom it may concern:*

Be it known that I, LUTHER SHAFFER, a citizen of the United States, residing at Boone, in the county of Boone, State of Iowa, have invented a new and useful Plant-Setting Machine; and I do hereby declare the following to be a full, clear, and exact description of the invention, such as will enable others skilled in the art to which it appertains to make and use the same.

The present invention is a machine for setting out young plants, and has for its object to provide a device of this character which embodies novel features of construction whereby large quantities of young plants can be quickly set out with a comparatively small amount of labor.

Further objects of the invention are to provide a machine for setting out young plants which is comparatively simple and inexpensive in its construction, which can be moved over a field without difficulty, which is at all times under perfect control of the operator, which will handle the plants without danger of breaking or mutilating the same, and which packs the dirt firmly around the roots of the plants, always leaving the plants in an upright position.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Fig. 2 is a longitudinal vertical sectional view through the same.

Fig. 3 is a transverse vertical sectional view through one side of the machine, taken on the line 3—3 of Fig. 2.

Fig. 4 is an enlarged side elevation of a plant carrying apron.

Fig. 5 is a side elevation of a guard for protecting the plants, showing its relation to the furrow covering disks.

Fig. 6 is a top plan view thereof.

Corresponding and like parts are referred to in the following description and indicated in all the views of the drawings by the same reference characters.

Figure 1:
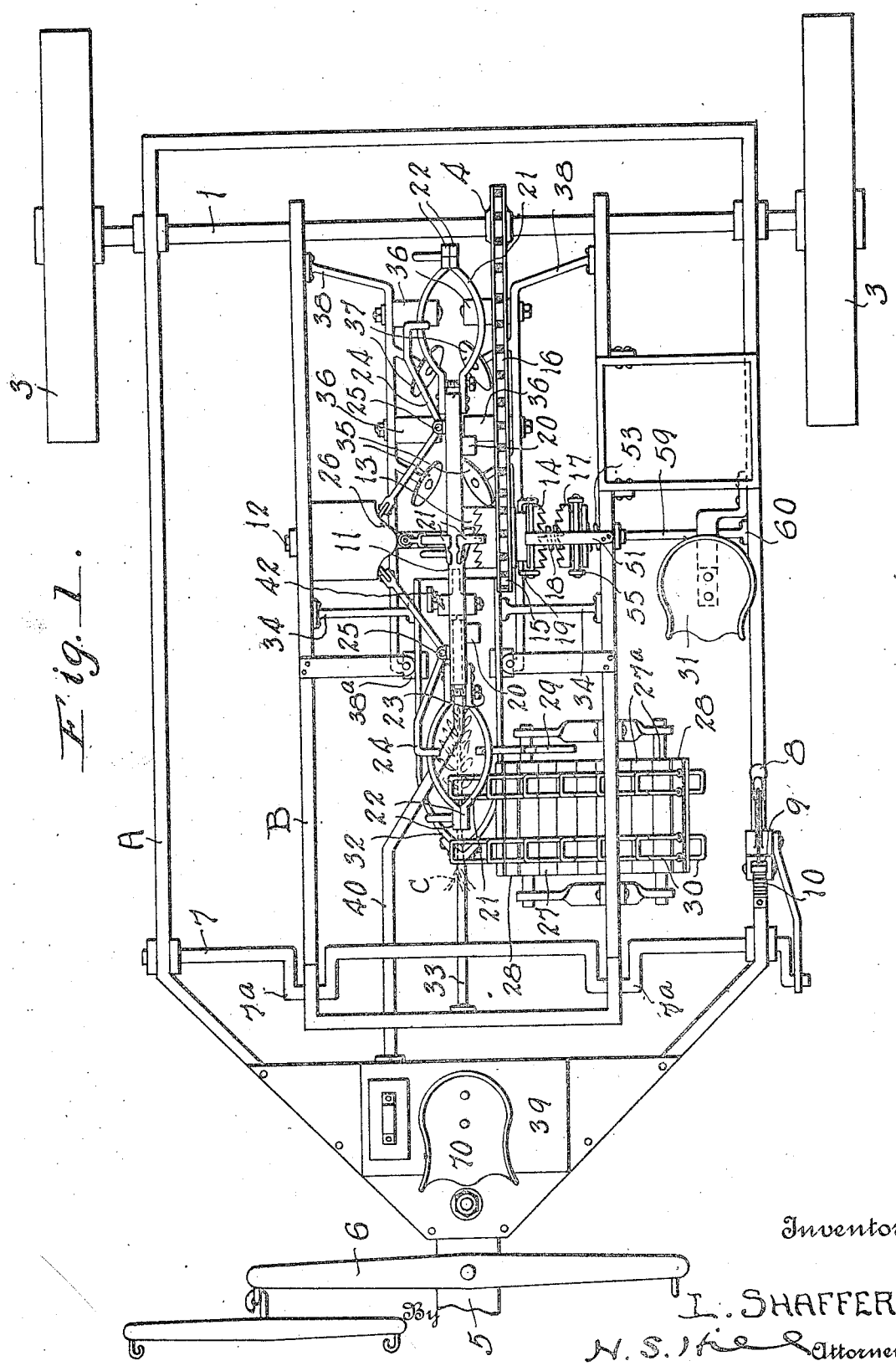
Figure 1 is a top plan view of a machine for setting out young plants constructed in accordance with the invention.

Specifically describing the present embodiment of the invention, the reference character A designates the main frame which is supported at the rear end thereof by the axle 1 and at the forward end thereof by a caster wheel 2. The usual wheels 3 are fixed upon the ends of the rear axle 1, said rear axle being provided at an intermediate point in its length with the drive sprocket 4. The draft animals are designed to be hitched to the forward end of the main frame, the usual tongue 5 and doubletree 6 being shown as provided for this purpose.

An adjustable frame B upon which the planting mechanism is mounted is arranged within the main frame A. The rear end of the frame B is pivoted upon the rear axle, while the forward end thereof is slidably engaged by the crank portion 7ª of a crank shaft 7. A lever 8 is operatively connected to one end of the crank shaft 7, and it will be obvious that by manipulating this lever the frame B can be swung up and down, thereby enabling the mechanism to be adjusted for either a shallow or a deep planting. This lever 8 is shown as provided with the usual latch 9 which is mounted for engagement with a segmental rack 10 to lock the lever in an adjusted position.

The planting wheel 11 is rigidly mounted upon a transverse shaft 12 which is journaled upon the frame B, said wheel being provided with a clutch face 13 which is adapted to be engaged by a sliding clutch member 14 arranged upon the shaft 12 at one side of the planting wheel. The clutch member 14 carries a sprocket wheel 15 which is connected by a chain 16 to the before mentioned drive sprocket 4 on the rear axle 1. A clutch disk 17 is applied to the shaft 12 on the side of the clutch member 14 opposite to the planting wheel 11 and a spring 18, which is interposed between the clutch disk 17 and the clutch member 14, normally tends to slide the latter into engagement with the clutch face 13 of the planting wheel 11, thereby producing an operative connection between the planting wheel and the rear axle so that the planting wheel is rotated when the machine is advanced. A shifting lever 19 is provided for sliding the clutch member 14 back and forth upon the shaft 12 to bring it alternately into engagement with the clutch face 13 of the planting wheel and the clutch disk 17. Cam or wedge members 20 are applied to the face of the planting wheel 11 at suitable intervals, and when one of the wedge members engages the shifting lever 19 the sliding clutch member 14 is moved away from the clutch face 13 of the planting wheel.

Projecting radially from the periphery of the planting wheel 11 at suitable intervals are the planting arms 21, said arms being arranged in pairs, and the arms of each pair being bowed outwardly in opposite directions to provide ample clearance space for the top of the young plant C which is being set out. The ends of the planting arms 21 terminate in the jaws 22 which are adapted to grip the stalk of the young plant C at a point just above the roots thereof. These plant gripping jaws 22 are shown as projecting laterally from the ends of the planting arms and they may be crimped or shaped in such a manner as to grip the plants without danger of injuring the same. Adjusting screws 23 are applied to the inner ends of the planting arms 21, said screws being threaded in one of each pair of the planting arms and engaging the opposite planting arm so that proper adjustment can be made for setting out large or small plants. When the adjusting screws 23 are tightened the jaws 22 will be sprung slightly apart so that there will be no undue pressure upon the stalk of a large plant. The spring planting arms 21 on one side of the planting wheel are each engaged by a releasing lever 24, said levers being pivotally mounted upon the planting wheel 11 at intermediate points in their lengths, as indicated at 25, and the inner ends of the levers slidably engaging an inclined cam track 26 which surrounds the shaft 12. The cam surface of the track 26 is arranged to actuate each of the jaw operating levers 24 to open the jaws and release the plant when the plant has been carried down into the furrow and properly positioned therein. The plant engaging jaws 22 are then held in an open position until they are rotated into proper position to receive another young plant, at which time they are automatically released and permitted to grip the young plant.

For the purpose of automatically feeding the young plants C to the planting wheel 11, a transversely extending and horizontally disposed endless apron 27 is arranged upon one side of the frame B, said apron passing around the two rollers 28, one of which is provided with radially extending arms 29 which project into the path of the planting arms 21. The endless apron 27 is shown as formed of a series of transverse slats 27ª, each of the said slats carrying a pair of plant supporting arms 30 which project laterally from the top thereof so as to assume a substantially horizontal position when the respective slat 27ª is in a horizontal position. The outer ends of the resilient plant supporting arms 30 may be crimped to provide corresponding seats 30ª within which the young plants C are placed. One set of the plant supporting arms 30 will always project from the end of the apron 27 so as to hold a young plant C in proper position to be gripped by the jaws 22 of a pair of planting arms 21 when the planting wheel 11 is rotated sufficiently for that purpose. The cam track 26 will act upon the jaw controlling lever 24 to hold the jaws 22 in an open position until the jaws have been rotated into proper position to receive the stalk of the young plant C upon the arms 30 between the same. The jaws 22 will then be automatically released and permitted to grip the young plant. A continued rotary movement of the planting wheel 11 then causes the planting arms 21 to engage the radial arms 30 at the end of one of the rollers 28 upon which the apron 27 is mounted, thereby automatically advancing the apron a sufficient amount to bring another young plant into position for engagement by the next set of planting arms 21. The young plants will be properly applied by hand to the supporting arms 30 of the apron 27 by an operator who may occupy a seat 31 on the main frame A. These young plants which are thus placed upon the seats 30ª of the supporting arms 30 will be automatically brought into proper position as the apron 27 is advanced step by step by engagement of the planting arms 21 with the radial arms 29 of the roller 28.

A furrow opener 32 is carried by the frame A and constructed to open the ground to receive the young plants which are being set out. This furrow opener 32 is shown as suspended by brackets 33 at the front end thereof, the rear end thereof being rigidly connected to the frame B by the rods 34. The planting arms 21 of the planting wheel 11 take the small plants C from the plant feeding apron 27 and deposit them at proper intervals in the furrow. The young plant is tightly gripped between the jaws 22 until the planting arms 21 reach a vertical position. The respective jaw controlling lever 24 then engages a raised portion of the cam track 26 so as to spring the jaws apart and release the same. At the same time the roots of the young plants are covered with dirt which is thrown upon the same by suitable means such as the disks 35. Packing rollers 36 then pass upon opposite sides of the young plant and compress the loose dirt around the roots thereof. A second set of disks 37 may follow the packing rollers 36 for throwing more dirt around the roots of the plant. The two sets of disks 35 and 37, as well as the packing rollers 36, may be journaled upon resilient side arms 38 which are pendent from the frame B, and connected to the furrow opener 32 by blocks 38ᵃ carried by the ends of the arms 38, which blocks are slidably mounted in slots 32ᵃ in the furrow opener and influenced downwardly by springs 38ᵇ.

At the same time that the young plant is released by the jaws 22 of the planting arms 21 and permitted to drop into the furrow, one of the cam members 20 on the side of the planting wheel 11 engages the shifting lever 19 and actuates the same to disengage the sliding clutch 14 from the clutch face 13 of the planting wheel 11, the said clutch being moved into engagement with the clutch disk 17. As the sliding clutch 14 is moved from one position to the opposite position there will be a slight amount of lost motion and the planting wheel will drop back one notch, thereby providing for momentary pause thereof, and eliminating any possibility of the young plant being pulled up by the planting arms. As soon as the cam or wedge shaped member 20 is carried beyond the end of the shifting lever 19, the spring 18 will again return the sliding clutch member 14 to engagement with the clutch face 13 of the planting wheel 11. A momentary pause in the rotation of the planting wheel 11 is thus obtained as each young plant is deposited in the furrow, and the possibility of the young plant being pulled up by the planting arms is thus avoided.

Provision may also be made for watering the young plants as they are set out. For this purpose a water reservoir 39 is shown as mounted upon the forward end of the device and connected by a pipe 40 to a discharge nozzle 41 which is arranged within the furrow opening 32. A conventional form of valve is provided for controlling the outflow of the water through the nozzle 41, said valve being arranged to be controlled by a trip lever 42 which projects into the path of the planting arms 21. A spring 43 is connected to the trip lever 42 and normally holds the valve in a closed position. However, as the planting wheel revolves, the planting arms 21 will be successively brought into engagement with the trip lever 42 so as to open the water supply valve at the necessary intervals of time for supplying water to the young plants as they are set out.

While I have shown the planting wheel 11 as provided with four sets of planting arms 21, it will be understood that a greater or less number of planting arms may be provided, depending upon the spaces which it may be desired to maintain between the young plants being set out. These planting arms 21 are easily removable, and the operator can either apply additional planting arms to the wheel to obtain a closer spacing of the young plants, or remove a portion of the planting arms already upon the wheel in order to obtain a greater spacing between the young plants.

Means have been above generally described for momentarily disengaging the clutch 14 from the planting wheel so as to stop the rotation of the wheel for a moment when a plant is being deposited in the furrow from the planting arms, and it is desirable to combine with this mechanism means for entirely disengaging both the clutch 14 and clutch disk 17 from the planting wheel when the machine is out of use or when it is desired to cease planting while turning the machine around at the end of furrows. For this purpose the clutch lever 19 is bifurcated at its upper end, as indicated at 19ᵃ, the arms of the bifurcation being connected by a pivot bolt 50 which is supported by a transversely extending bracket 51. The arms of the bifurcation straddle and engage the clutch sleeve 14, while the lower end of the lever 19 is projected downwardly and the offset at 19ᵇ so as to engage the inclined blocks 20 carried by the planting wheel. At the instant that the lower set of planting arms 21 reach the proper position to drop a plant into the furrow, the off-set lower end 19ᵇ of the lever 19 is engaged by the block 20 arranged adjacent the arms 21, and the clutch sleeve 14 forced out of engagement with the clutch face 13 of the planting wheel 11, and into engagement with the clutch disk 17. The teeth of the clutch disk 17 are so arranged with relation to the teeth of the clutch sleeve 14 that after disengagement of the clutch sleeve 14 from the clutch face 13 of the planting wheel it is necessary for the clutch sleeve 14 to rotate a distance equal to substantially the distance between the teeth on the clutch sleeve 14 before a positive engagement is made with the clutch disk 17. In other words, the teeth of the clutch disk 17 are so arranged that the corresponding teeth on the clutch sleeve 14 are substantially a distance equal to the distance between the teeth behind the teeth of the clutch disk 17. This arrangement of the teeth of the clutch sleeve 14 and clutch disk 13 is clearly shown by Fig. 1 of the drawings, and it will be obvious that after disengagement of the clutch sleeve 14 from the clutch face 13 the planting wheel will remain stationary a period of time equal to that consumed by the rotation of the clutch sleeve 14 forward the distance of one tooth.

This momentary stoppage of the planting wheel 11 allows the plant to be dropped into the furrow while the planting arms are stationary, thus obviating the possibility of the plant being pulled up or knocked over by the arms as would probably be the case if the plant was dropped while the wheel rotated. As soon as the clutch sleeve 14 positively engages the clutch disk 17, the wheel 11 will be rotated so as to move the block 20 from engagement with the lever 19, when the spring 18 will force the clutch sleeve 14 again into engagement with the clutch face 13. The wheel will then be rotated until the next block 20 is brought into engagement with the lever 19, when the clutch sleeve 14 will again be operated as above described.

The clutch disk 17 is slidably mounted upon a square portion 52 of the shaft 12, and is normally forced toward the clutch sleeve 14 by a spring 53, although its movement in this direction is limited by the lug 54 on the inner end of the square portion of the shaft. The before mentioned spring 18 is interposed between the lug 54 and the clutch sleeve 14 and normally tends to separate the clutch disk 17 and the clutch sleeve 14. A second clutch lever 55 similar in construction to the before mentioned lever 19 engages the clutch disk 17 and is pivotally mounted upon the bracket 51 by means of a pivot bolt 56. The lower ends of both the levers 55 and 19 are provided with the respective slots 57 and 58, the said slots being inclined inwardly at corresponding angles. A rod 59 has one end thereof rigidly secured at 60 to the side bar of the main frame A of the machine, while the inner end thereof projects inwardly and through both of the slots 57 and 58 in the levers 55 and 19. The inner end of this rod 59 is provided with the balls or shoulders 61 which are arranged upon the inner sides of the slots 57 and 58, and are of a size greater than the width of the slots so as to prevent them from passing therethrough. With this construction it will be seen that when the swinging frame B is thrown upwardly into an inoperative position by means of the crank shaft 7, the inclined slots 57 and 58 of the levers 55 and 19 will coöperate with the balls 61 on the rod 59 so as to force both the clutch disk 17 and clutch sleeve 14 away from the planting wheel 11, and owing to the corresponding inclination of the slots 57 and 58 the clutch disk 17 and clutch sleeve 14 will be moved corresponding distances so that they will also be separated. The clutch sleeve 14 will then be free to rotate loosely upon the shaft 12, although it will be disengaged entirely from the planting wheel and the clutch disk 17 so that the machine may be drawn about over the ground with the planting wheel in a stationary position. It will thus be seen that the mechanism described operates so that when the swinging frame B is swung upwardly into inoperative position the rotation of the planting wheel is automatically stopped.

A seat 70 is provided at the front of the machine for the driver of the draft animals, the seat 31 being provided for the operator placing the plants upon the carrier apron 27.

It might be desirable when setting out certain kinds of young plants to provide means for preventing the covering disks 35 from completely covering the plants with earth. One possible solution of this problem is shown by Figs. 5 and 6 of the drawings. Sheet metal guard plates 71 are bent outwardly in front of the disks 35, the side edges of the plates being bent rearwardly and secured to the disk and packing roller carrying arms 38. The lower edges of the plates are spaced from the level of the ground to allow the loose earth to pass beneath them and about the roots of the plants. With this construction the disks 36 may force the earth under the plates 71 to completely cover the roots of the plants, but an excessive amount of earth or large lumps are prevented from falling upon the plants and held back by the guard plates 71. These guards may or may not be used according to the varying requirements and conditions.

Having thus described the invention, what I claim as new and desire to secure by Letters Patent, is:—

1. A machine for setting out young plants, including a supporting frame, a planting wheel mounted thereon, spring planting arms projecting radially therefrom and arranged in coöperating pairs for gripping the plants, means for supplying young plants to the planting arms, a furrow opener, means for automatically separating the planting arms to deposit the young plant in the furrow, and means for momentarily interrupting the rotation of the planting wheel as each plant is released.

2. A machine for setting out young plants, including a supporting frame, a planting wheel mounted thereon, spring planting arms projecting radially therefrom and arranged in coöperating pairs to grip the plants, means for supplying young plants to the planting arms, a furrow opener, means for automatically separating the planting arms to deposit the young plants in the furrow, clutch controlled driving means for the planting wheel, and means for automatically opening the clutch as each young plant is released.

3. A machine for setting out young plants, including a supporting frame, a planting wheel mounted thereon and provided with a clutch face, a shaft carrying the planting wheel and rigid therewith, a clutch disk rigid with the shaft, a sliding clutch member mounted upon the shaft and adapted to be moved into engagement with the clutch face of the planting wheel or the clutch disk, yielding means holding the clutch member in engagement with the planting wheel, driving means connected to the sliding clutch, a shifting lever engaging the sliding clutch, planting arms projecting from the planting wheel for receiving young plants and depositing them in the furrow, a furrow opener, and cam means upon the planting wheel for engaging the shifting lever to momentarily shift the position of the sliding clutch each time a young plant is deposited.

4. A machine for setting out young plants, including a supporting frame, a planting wheel mounted thereon, and provided with a clutch face, a shaft carrying the planting wheel and rigid therewith, a clutch disk rigid with the shaft, a sliding clutch member mounted upon the shaft for engagement with either the planting wheel or the clutch disk, a spring normally holding the sliding clutch member in engagement with the clutch face of the planting wheel, a shifting lever operatively connected to the sliding clutch member, driving means for rotating the sliding clutch member, planting arms projecting from the planting wheel and arranged in coöperating pairs for gripping the plants, a furrow opener, means for automatically separating the planting arms to deposit the young plants in the furrow, and cam members upon the planting wheel for engagement with the shifting lever to automatically and momentarily shift the position of the sliding clutch each time a young plant is deposited, thereby causing a pause in the rotation of the planting wheel.

5. A machine for setting out young plants, including a supporting frame, a shaft, a planting wheel mounted upon the shaft, clutch controlled driving means for rotating the planting wheel, a shifting lever for the clutch controlled drive means, planting arms projecting radially from the planting wheel and arranged in coöperating pairs for gripping the plants, means for supplying young plants to the planting arms, a furrow opener, an annular cam track, releasing levers mounted upon the planting wheel and actuated by engagement with the cam track to automatically separate the planting arms and deposit the young plants in the furrow, and cam members upon the planting wheel for engaging the shifting lever to momentarily break the driving connection each time a young plant is deposited.

6. A machine for setting out young plants, including a supporting frame, a planting wheel mounted thereon, planting arms projecting therefrom and arranged for gripping the plants, an endless feed apron for supplying the plants to the planting arms, means operatively connected to the feed apron and arranged in the path of the planting arms for advancing the endless feed apron, and means for rotating the planting wheel.

7. A machine for setting out young plants, including a supporting frame, a planting wheel mounted thereon, planting arms projecting therefrom and arranged for gripping the plants, an endless feed apron for supplying the plants to the planting arms, said feed apron comprising a belt mounted upon rollers, radial arms projecting from one of the feed apron rollers and arranged in the path of the planting arms for advancing the feed apron, and means for rotating the planting wheel.

8. A machine for setting out young plants including a main supporting frame, a second frame pivotally mounted upon the main frame and adapted to be raised into an inoperative position and lowered into an operative position, a planting wheel mounted thereon, clutch controlled means for rotating the planting wheel, when the second frame is in an operative position, a lever operatively connected with said clutch means and having a cam thereon, and means upon the main supporting frame adapted to coöperate with said cam to stop the rotation of the planting wheel when the second frame is raised into an inoperative position.

9. A machine for setting out young plants, including a supporting frame, a planting wheel mounted thereon, means for rotating the planting wheel, and means for momentarily interrupting the rotation of the planting wheel as each plant is deposited.

10. A machine for setting out young plants, including a supporting frame, a planting wheel mounted thereon, clutch controlled means for rotating the planting wheel, and means carried by the planting wheel for operating the clutch controlled means to momentarily stop the rotation of the planting wheel as each plant is deposited.

11. A machine for setting out young plants, including a supporting frame, a second frame pivotally mounted thereon and adapted to be raised into an inoperative position or lowered into an operative position, a shaft thereon, a planting wheel mounted on the shaft and provided with a clutch face, a clutch disk rigid with the shaft, a sliding clutch member rotatably mounted upon the shaft and adapted to be moved into engagement with the clutch face of the planting wheel or the clutch disk, driving means connected to the sliding clutch, yielding means for normally holding the sliding clutch in engagement with the clutch face on the planting wheel, a lever operatively connected to the sliding clutch and provided with a cam, a second lever operatively connected to the clutch disk and provided with a cam, and means upon the main supporting frame adapted to coöperate with the cam upon each of said levers to shift the sliding clutch from engagement with the planting wheel, and the clutch disk away from the sliding clutch, when the second frame is raised into an inoperative position.

In testimony whereof I have signed my name to this specification in the presence of two subscribing witnesses.

LUTHER SHAFFER.

Witnesses:
HERBERT WOODRUFF,
HERMAN J. ABBENSETH.